United States Patent [19]
Foster et al.

[11] 3,773,389
[45] Nov. 20, 1973

[54] WHEEL COVER

[75] Inventors: Edwin E. Foster; Thomas E. Foster, both of Austin, Tex.

[73] Assignee: said Edwin E. Foster, by said Thomas E. Foster

[22] Filed: Dec. 27, 1971

[21] Appl. No.: 212,094

[52] U.S. Cl. .................... 301/37 R, 292/256.67 X
[51] Int. Cl. ............................................ B60b 7/06
[58] Field of Search ................ 301/37 R, 37 TP, 301/37 PB, 37 S; 292/140; 70/168, 169, 258

[56] References Cited
UNITED STATES PATENTS

| 2,631,895 | 3/1953 | Hunt | 301/37 PB |
| 3,663,065 | 5/1972 | Crompton | 301/37 R |
| 2,031,092 | 2/1936 | Begg | 301/37 S |
| 2,073,851 | 3/1937 | Powell | 301/108 |
| 3,512,840 | 5/1970 | Foster | 292/256.67 X |
| 3,663,064 | 5/1972 | McCarroll | 301/37 P |

FOREIGN PATENTS OR APPLICATIONS 1,128,902  10/1968  Great Britain ............... 301/37 TP Primary Examiner—Richard J. Johnson
Attorney—Arthur Raisch et al.

[57] ABSTRACT

A cover for a vehicle wheel having a plurality of wheel gripping spring fingers on the inner side thereof. At least one of the spring fingers is formed with an abutment engaged by a cam rotatably supported by the cover and operable from the outer side of the cover to displace and flex the spring finger into and out of engagement with the wheel to enable removal of the cover.

19 Claims, 26 Drawing Figures

INVENTORS
EDWIN E. FOSTER
BY THOMAS E. FOSTER

INVENTORS
EDWIN E. FOSTER
BY THOMAS E. FOSTER

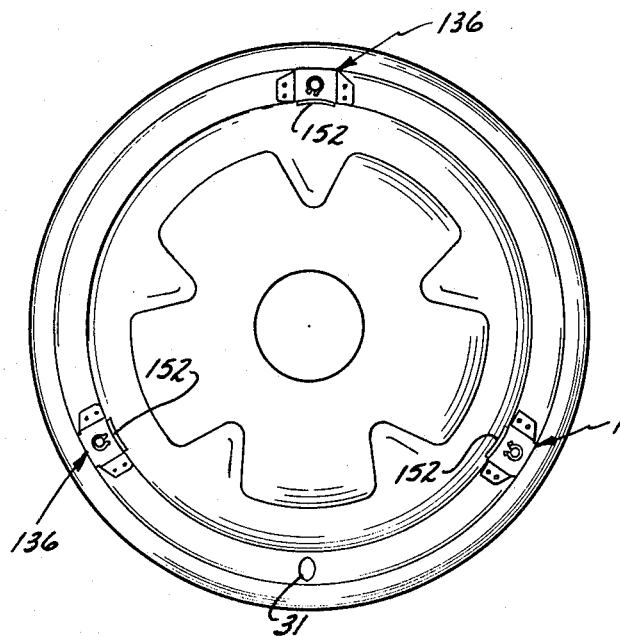
Fig-15
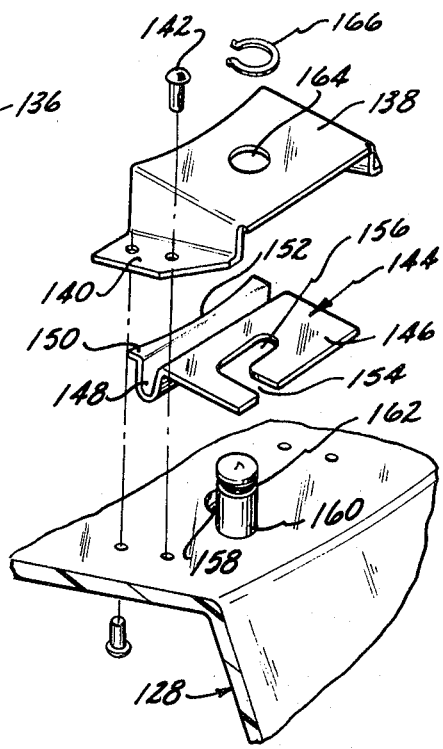
Fig-16
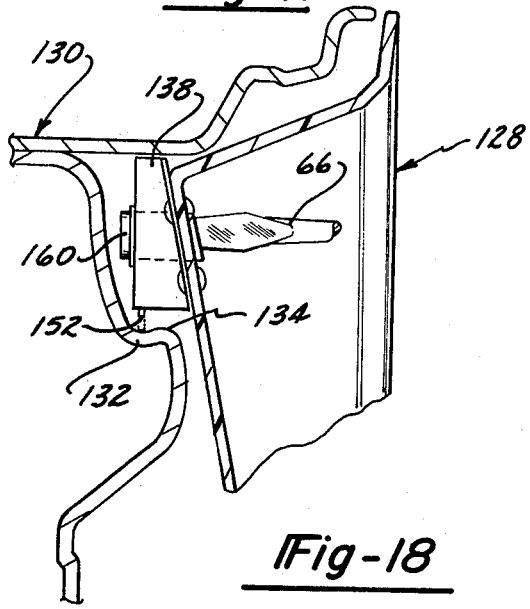
Fig-17
Fig-18
INVENTORS
EDWIN E. FOSTER
THOMAS E. FOSTER
BY
Barnes, Kisselle, Raisch & Choate

INVENTORS
EDWIN E. FOSTER
BY THOMAS E. FOSTER

INVENTORS
EDWIN E. FOSTER
BY THOMAS E. FOSTER

3,773,389

WHEEL COVER

This invention relates to vehicle wheel covers and more particularly to a novel arrangement for releasably retaining a cover on a vehicle wheel.

Conventional vehicle wheel covers normally have a plurality of sharp edged spring fingers thereon which, when the cover is applied to the wheel, flex radially inwardly to frictionally engage an annular surface on the wheel rim to retain the cover thereon. Such wheel covers are normally removed by forcibly prying the cover off the wheel. Since the sharp edges of the spring fingers tend to dig into the portion of the wheel with which they are engaged, when the cover is pried off they tend to gouge the wheel surface. For this reason the removal of such covers normally requires considerably more force than necessary to apply the wheel to the cover. Accordingly, the retention force which each spring finger is designed to exert on the wheel is limited to a large extent by the force required to pry the cover off the wheel. As a result conventional wheel covers employ many such spring fingers and positive retention of the cover on the wheel is rarely achieved.

The present invention has for its primary object the provision of retention means on a vehicle wheel cover in the form of spring fingers which are relatively few in number, which are designed to firmly and positively retain the cover on the wheel, and which at the same time enable ready removal of the cover from the wheel by the application of relatively little force.

A more specific object of the present invention resides in the provision of only a few spring fingers on the inner side of a wheel cover which are designed to be highly stressed and firmly bite into the wheel when the cover is applied to the wheel but which are arranged so that at least one of them can be radially flexed out of engagement with the wheel by means of a cam on the inside of the cover which is rotated by a conventional tool from the outside of the cover when it is desired to remove the cover from the wheel. Thus, in the wheel of the present invention the force with which the cover is retained on the wheel is designed to be relatively great and the manual force required to remove the cover from the wheel is substantially less than the retention force because the retention force produced by the tension of the spring fingers is mechanically relieved to remove the cover from the wheel.

Other objects and advantages of the present invention will become apparent from the accompanying drawings and description, in which:

FIG. 1 is a plan view, with parts broken away, of the outer face of a wheel cover according to the present invention;

F:G. 2 is a fragmentary perspective view, partially in section, of a portion of the cover shown in FIG. 1 and illustrating its relationship relative to a vehicle wheel;

FIG. 15 is a plan view of the inner face of another form of cover according to the present invention;

FIG. 16 is an exploded perspective view of a portion of the cover with the cam and spring finger assembl;

FIG. 17 is a sectional view of the cam assembly;

FIG. 18 is a fragmentary sectional view showing the manner in which the cover is engaged with the wheel;

Figure 1:
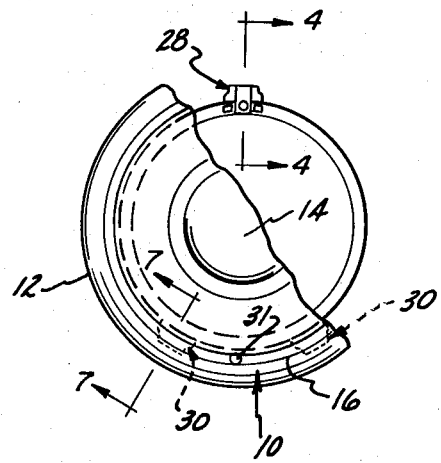
Figure 2:
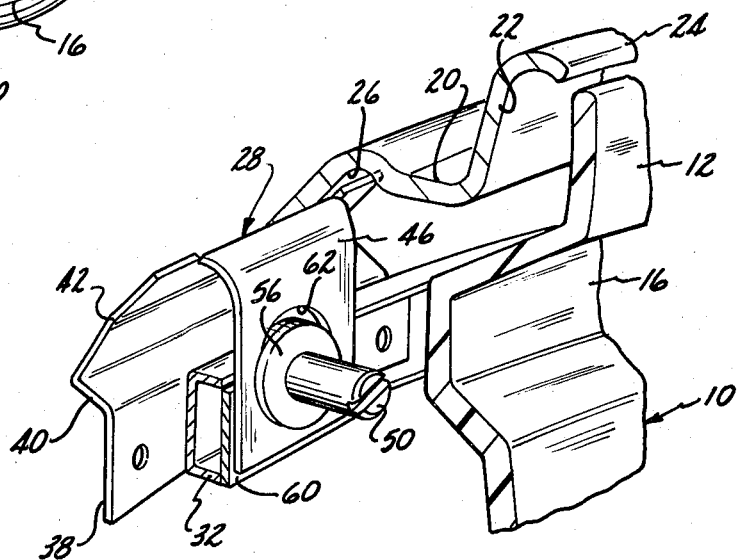
Figure 3:
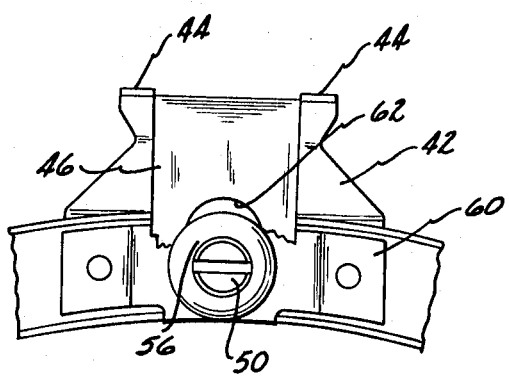
FIG. 3 is a fragmentary view, with portions broken away, of the cam mechanism for flexing the spring finger.
Figure 4:
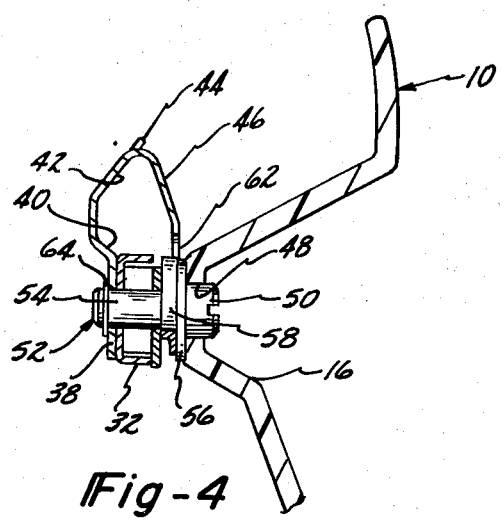
FIG. 4 is a fragmentary sectional view along line 4—4 in FIG. 1.
Figure 5:
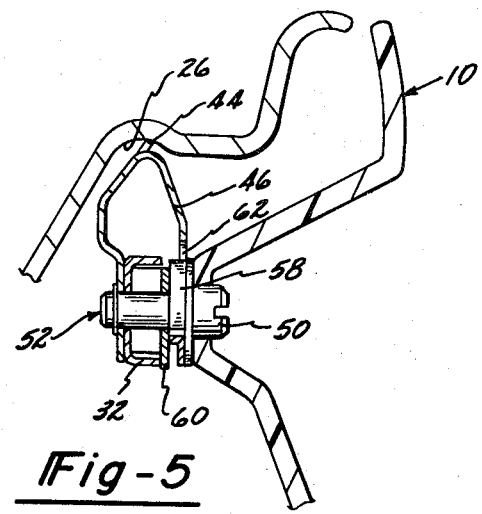
FIG. 5 is a view similar to FIG. 4 and showing the wheel cover mounted on a vehicle wheel.

Referring first to FIGS. 1 through 8, the wheel cover 10 shown therein is molded from plastic and is formed with a peripheral flange 12 which is connected with the central body portion 14 by an inwardly dished section 16. The vehicle wheel with which the cover is adapted to be used is formed with a rim 18 having a tire bead seat 20 and a tire bead flange 22 which is turned axially outwardly at its free edge as at 24. A safety groove 26 extends around tire bead seat 20 at the inner side thereof.

Figure 7:
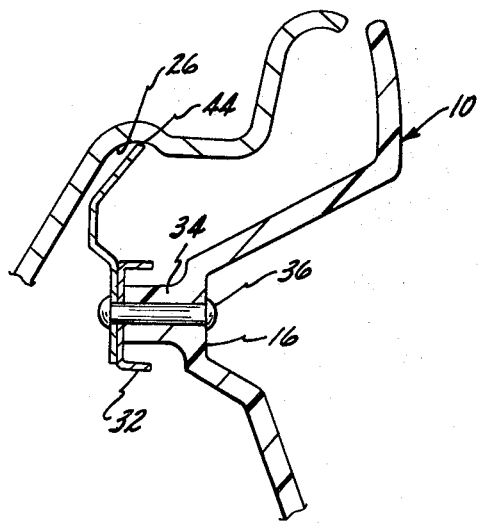
FIG. 7 is a fragmentary sectional view along line 7—7 in FIG. 1 and showing the cover mounted on the wheel.
Figure 8:
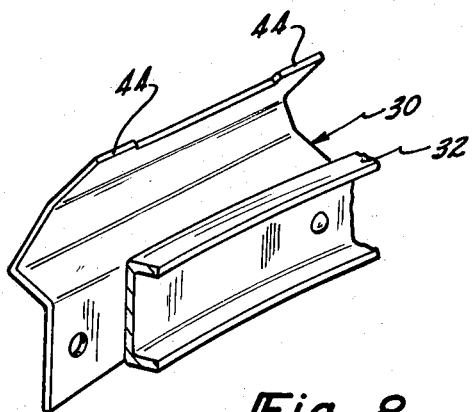
FIG. 8 is a fragmentary perspective view of the spring finger illustrated in FIG. 7.

In this embodiment of the invention the means for retaining the cover on the wheel are in the form of three spring fingers, one of which is designated 28 and the other two are designated 30. Spring fingers 28, 30 are arranged on the rear side of cover 10 such that fingers 28 and 30 are symmetrically disposed relative to finger 28 and are spaced therefrom through an arc of at least 90° and preferably in the range of about 150° to facilitate securing and removal of the cover on the wheel. An opening 31 in cover 10 to accommodate the valve stem on the wheel is preferably located diametrically opposite finger 28. Since the wheel cover shown is formed of plastic, it is reinforced on its rear face by a U-shaped metal ring 32 to prevent its distortion because of the wheel retention forces to which it is subjected. As shown in FIG. 7, the inner side of cover 10 is formed with a plurality of circumferentially spaced bosses 34 at the dished portion 16 on which reinforcing ring 32 is mounted by means of rivets 36.

Each of the spring fingers 28, 30 are formed with a flat base portion 38 seated against the axially inner face of ring 32. At one end base portion 38 is bent axially inwardly and radially outwardly as at 40, then axially outwardly to form a spring leg 42. Leg 42 is formed with a free edge portion 44. In the case of spring finger 28 leg 42 is fashioned with a central, radially inward extension forming a leg 46 which underlies the dished portion 16 of the wheel cover.

At the portion of each dished section 16 which registers axially with spring finger 28 the cover is formed with a round opening 48 in which the head 50 of a rotatable stud 52 is journalled. The end portion of stud 52 opposite head 50 is fashioned with a reduced shank portion 54 co-axial with head 50. The under side of head 50 is formed as an enlarged circular disc 56 co-axial with head 50. Between disc 56 and shank portion 54 the stud is formed with a circular cam 58 which is eccentric to the axis of the stud. The shank portion 54 is rotatably supported in registering apertures formed in reinforcing ring 32, base portion 38 of spring finger 28 and a U-shaped bracket 60 riveted within the channel-shaped reinforcing ring 32. Leg 46 of spring finger 28 is formed with an enlarged opening 62 through which cam 58 extends. Disc 56 bears against the under side of dished portion 16 and a snap ring 64 is engaged with the end of the shank portion 54 to retain stud 52 in position.

Figure 6:
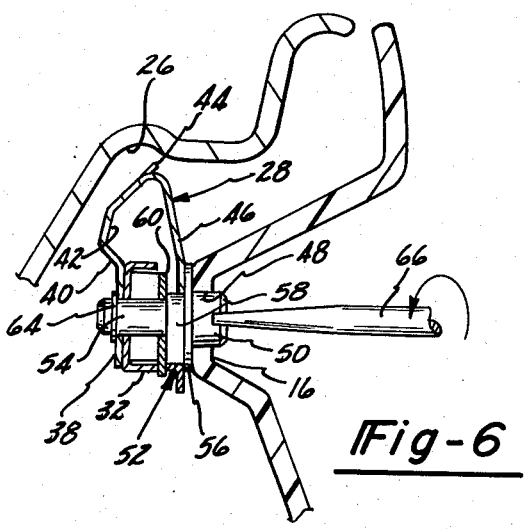
FIG. 6 is a view similar to FIG. 5 and showing the manner in which the wheel cover is disengaged from the wheel.

Opening 62 in leg 46 is substantially larger than the diameter of cam 58. Thus, when stud 52 is rotated (for example, by engaging a screw driver 66 with the head 50 of the stud), cam 58 is rotated to flex the free edge portion 44 of spring finger 28 radially. When the high side of cam 58 is located radially inwardly of the axis of stud 52 as shown in FIG. 6, leg 46 is flexed radially inwardly such that the free edge portion 44 of the spring finger 28 is retracted radially out of engagement with the safety groove 26 of rim 18. When cam 58 is rotated so that its high side is located on the radially outer side of the axis of stud 52, the tension in the spring displaces the free edge portion 44 radially outwardly into engagement with safety groove 26. However, when the high side of cam 58 is located radially outwardly of stud 52 the spring finger 28 is free to flex to a position wherein the free edge portion 44 is spaced radially from the center of the wheel a distance greater than the radius of the safety groove.

The wheel cover can be mounted on the wheel in either of two different modes. The two free edge portions 44 of spring fingers 30 can be initially engaged with the safety groove 26 while the remaining spring finger 28 is in the retracted position shown in FIG. 6 and, thereafter, cam 58 can be rotated to engage the free edge portion 44 of spring finger 28 with the safety groove. Alternatively, the free edge portion of spring finger 28 can be in the fully extended position and, after the free edge portions 44 of the other two spring fingers 30 are engaged with the safety groove 26 by inclining the cover to the plane of the wheel, the remaining spring finger 28 can be engaged with safety groove 26 by pressing the cover inwardly against the wheel to flex the spring finger radially inwardly and permit the free edge portion 44 to snap into engagement with safety groove 26. Regardless of which mode is adopted for mounting the cover on the wheel, since all three springs 28, 30 have substantially the same shape and spring characteristics, when the cover is engaged with the wheel all three springs are flexed to substantially the same extent and the cover is centered with respect to the wheel axis. To remove the cover it is only necessary to rotate stud 52 so that the high side of cam 58 is disposed radially inwardly of the axis of the stud. This causes the free edge portion 44 of spring finger 28 to be retracted to the position shown in FIG. 6 in which position the other two springs 30 are relieved and the cover can be freely withdrawn from the wheel.

Figure 9:
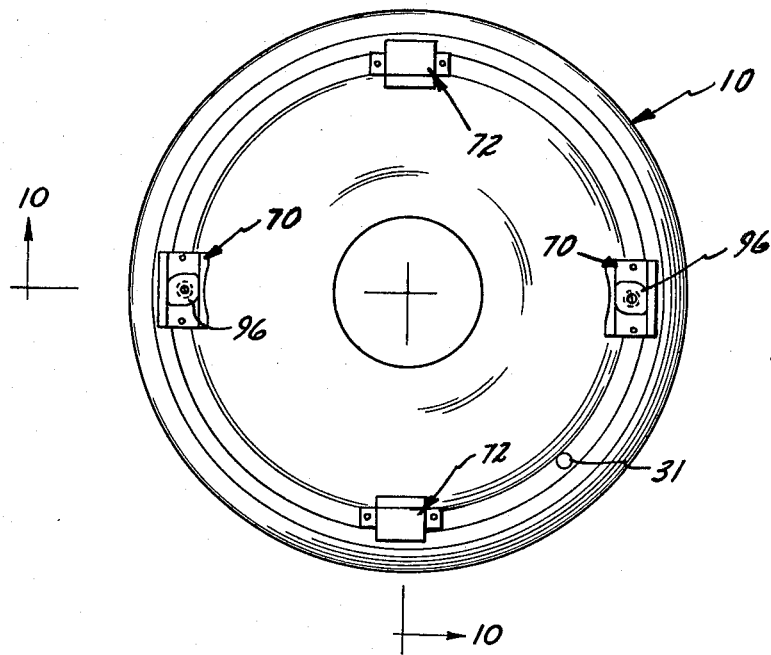
FIG. 9 is a plan view of the rear side of another cover in accordance with the present invention.
Figure 10:
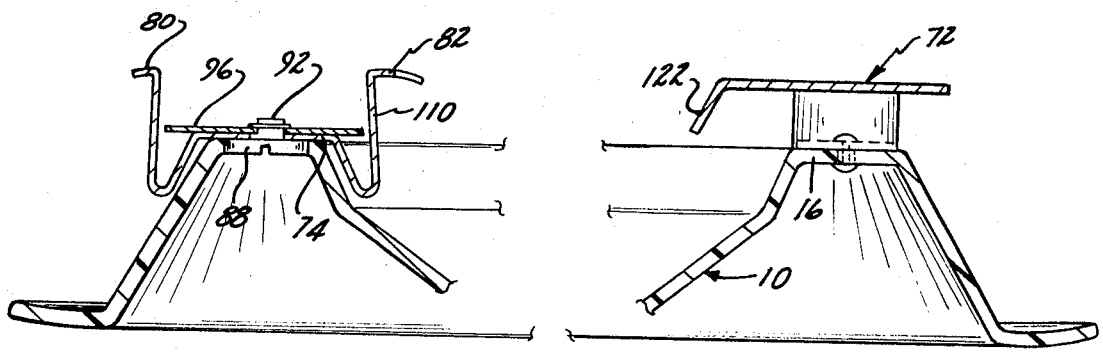
FIG. 10 is a fragmentary sectional view along line 10—10 in FIG. 9.
Figure 11:
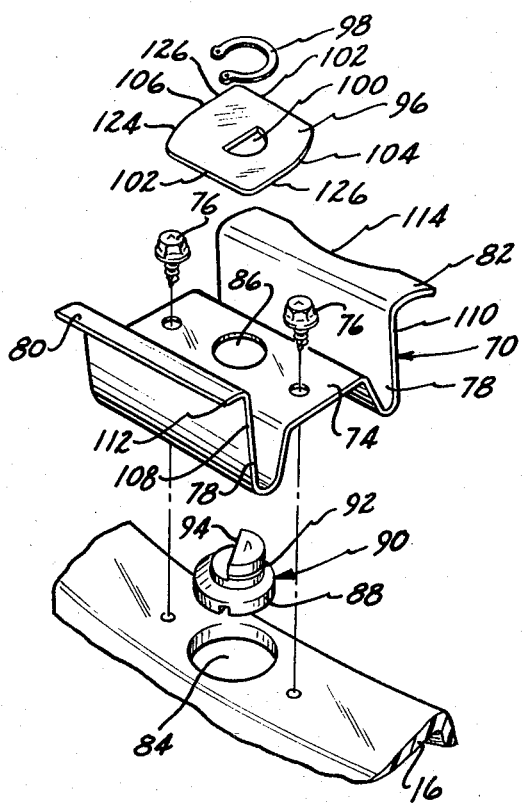
FIG. 11 is an exploded perspective view of a portion of the cover, spring finger and cam arrangement.

In the embodiment illustrated in FIGS. 9 through 14 the spring finger arrangement for retaining the cover on the wheel is designed such as to eliminate the application of all retention forces on the cover. Accordingly, with this arrangement a reinforcing ring (such as shown at 32 in FIGS. 1 through 8) is rendered unnecessary The cover is provided with two spring fingers 70 which, as shown in FIG. 9, are disposed diametrically opposite one another. The cover is also provided with two guide fingers 72 which are located diametrically opposite one another and spaced through an arc of 90° from spring fingers 70. As shown in FIG. 11, each spring finger 70 is fashioned with a central flat base portion 74 which is attached to the flat dished portion 16 of the cover 10 as by screws 76. At the radially opposite edges of base portion 74 each spring finger 70 is fashioned with a U-shaped spring portion 78. The outer leg of each spring portion 78 is extended axially inwardly beyond base portion 74 and at the end thereof is formed with a radial flange. The outer radial flange is designated 80 and the inner radial flange is designated 82.

The dished portion 16 of cover 10 is formed with an opening 84 centrally of each spring finger 70 and the base portion 74 of each spring finger is formed with a smaller opening 86 co-axial with the opening 84. Opening 84 accommodates the head 88 of a stud 90 and opening 86 accommodates the shank 92 of the stud. As shown in FIG. 11, shank 92 has a non-circular portion 94 on which a generally rectangular cam plate 96 is retained by a snap ring 98. The opening 100 in cam plate 96 corresponds in shape with the non-circular portion 94 of shank 92. Cam plate 96 has a pair of straight parallel edges 102 and two cam edges 104, 106. Cam plate 96 is disposed flat against base portion 74 of each spring finger 70. When the edges 102 of cam plate 96 are disposed generally parallel with the outer legs 108, 110 of the two spring portions 78 these two legs of the spring finger assume their free inwardly flexed position shown in solid lines in FIG. 13. When the cover is placed centrally against the outer face of the wheel the outer legs 108, 110 are in their normally retracted position so that the outer corners 112 of the outer flanges 80 are spaced radially inwardly of the safety groove 26 and the dished edge 114 of the inner flange 82 is spaced radially outwardly of the annular groove 116 which is defined at the central portion of the wheel by bumps 118 normally formed on conventional wheels to accommodate a hub cap.

Figure 12:
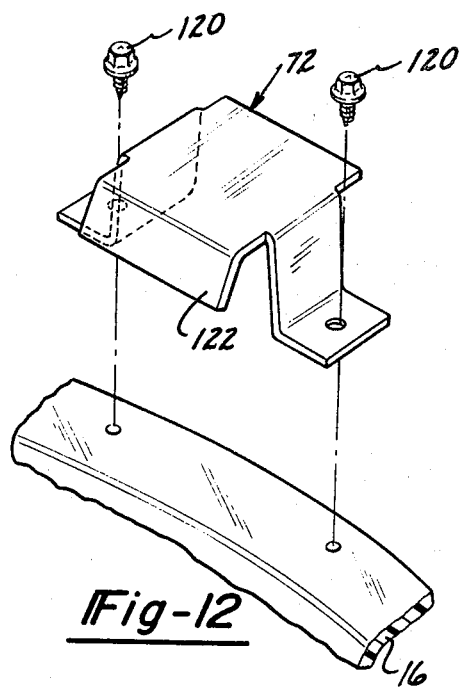
FIG. 12 is an exploded view of a portion of the cover and a guide member.
Figure 13:
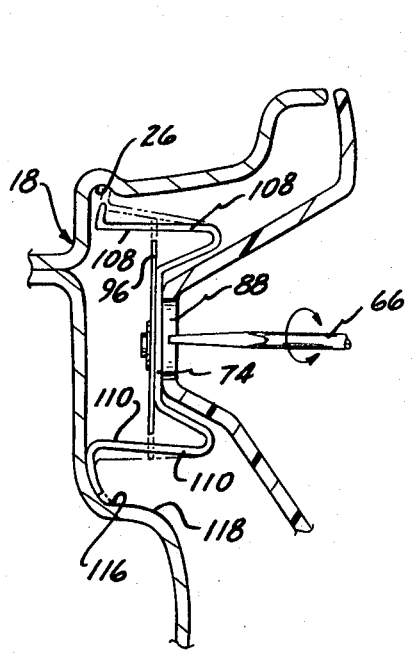
FIG. 13 is a fragmentary sectional view illustrating the manner in which the cam operates the spring finger.
Figure 14:
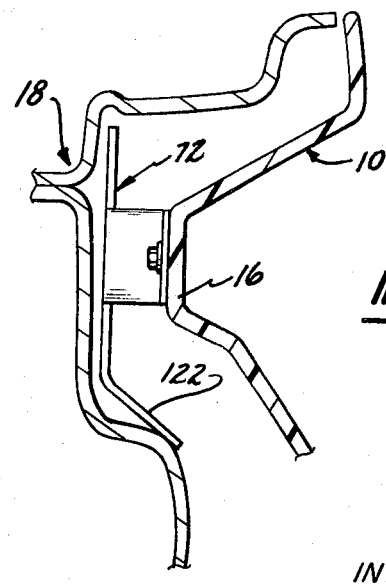
FIG. 14 is a fragmentary sectional view of the cover and wheel showing the function of the guide member.
Figure 19:
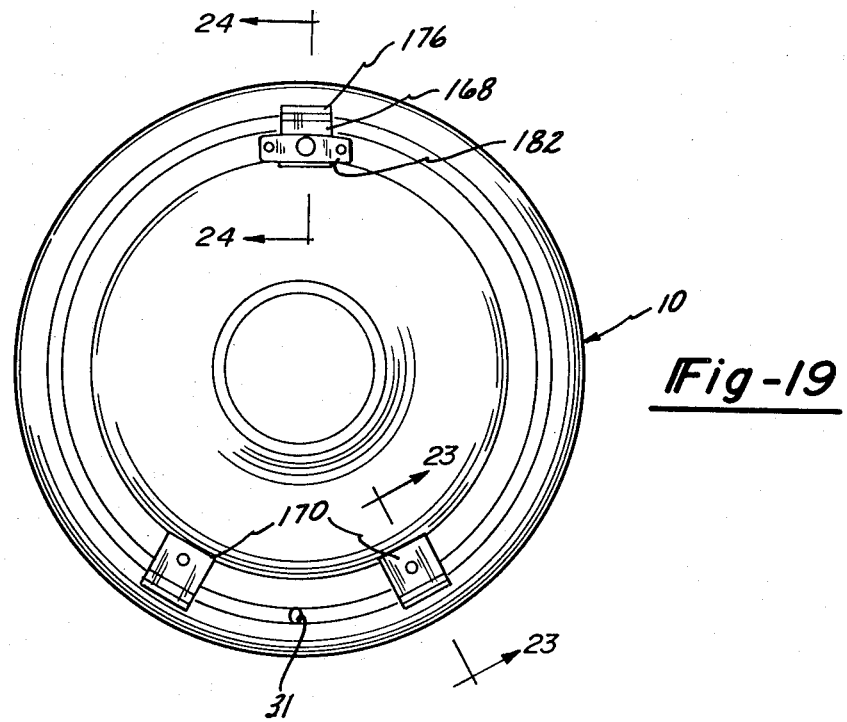
FIG. 19 is a plan view of the inner face of another cover according to the present invention.
Figure 20:
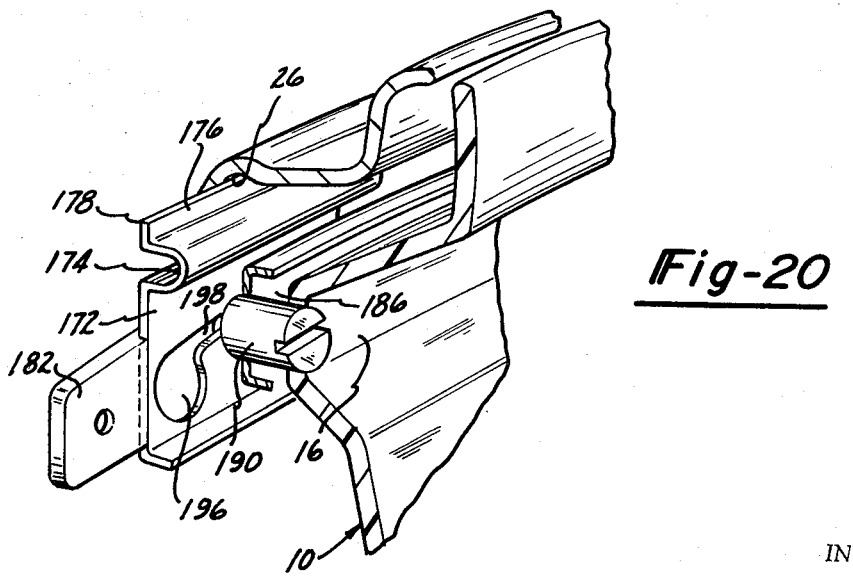
FIG. 20 is a fragmentary sectional view, with parts broken away, of the cover shown in FIG. 19 in relation to the wheel on which it is mounted.
Figure 21:
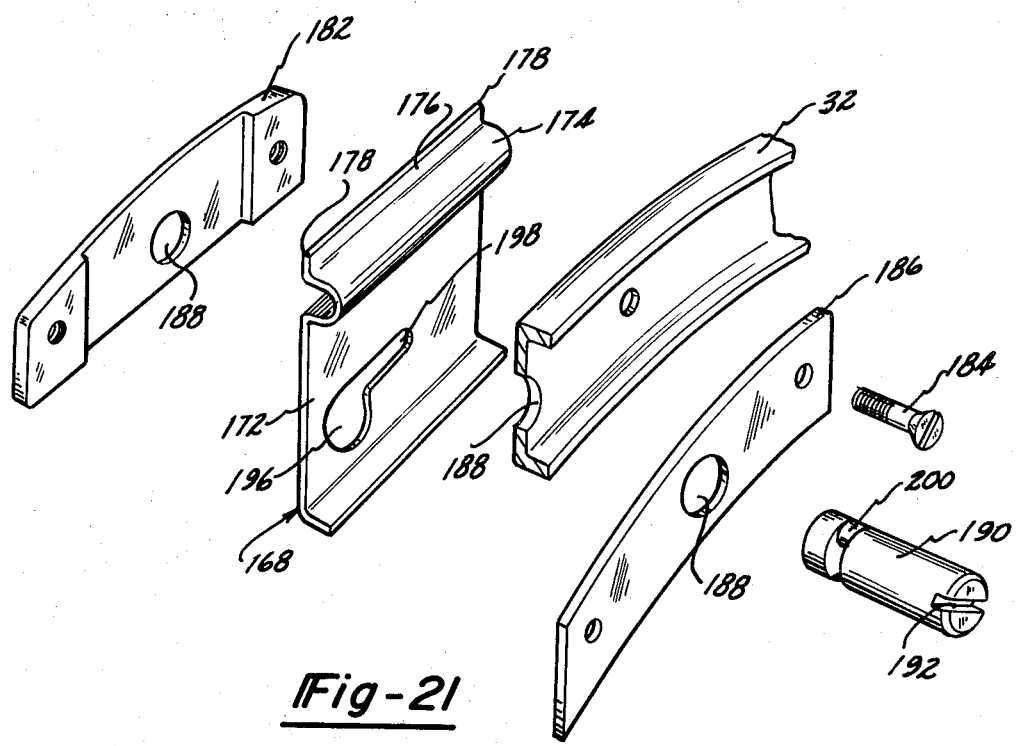
FIG. 21 is an exploded perspective view of the spring finger and cam assembly.

As shown in FIGS. 12 and 14, guide members 72 are mounted on the dished portion 16 of the wheel cover 10 by screws 120 and are formed with inclined flanges 122 which engage the central portion of the wheel to center the cover on the wheel. Thus, when the cover is applied to the wheel it is automatically centered thereon and freely received by the wheel since the two spring legs 108, 110 of spring fingers 70 are in their free retracted position. Thereafter, each of the studs 90 are rotated, as by the screw driver 66, to interengage the cam edges 104, 106 on each cam plate 96 with spring legs 110, 108, respectively, on each spring finger. Each of the cam edges 104, 106 has a curved cam portion 124 and a straight edge portion 126. As stud 90 is rotated in a clockwise direction the curved edges 124 engage spring legs 108, 110 to flex them radially such that the outer corners 112 of flange 80 engage in safety groove 26 and the dished edge 114 of flange 82 engages within the groove 116 on the wheel. When cam plate 96 is rotated to a position wherein the straight edges 126 thereof fully engage with the opposed inner faces of spring legs 108, 110 these spring legs assume the flexed stressed positions shown in broken lines in FIG. 13, in which position the wheel cover 10 is securely mounted on the wheel. To remove the cover it is merely necessary to rotate each stud 90 and its cam plate 96 on each of the two spring fingers 70 in a counter-clockwise direction and, thus, permit the two spring legs 108, 110 to flex toward one another back to the solid line retracted position shown in FIG. 13, in which position the wheel cover 10 can be freely withdrawn from the face of the wheel. In the embodiment illustrated in FIGS. 9 through 14 two wheel gripping spring fingers are illustrated since the wheel illustrated therein is formed with only two hub cap retaining bumps 118. If the wheel is provided with three or four such bumps, then a corresponding number of spring fingers can be employed.

Referring now to FIGS. 15 through 18, the wheel cover 128 shown in this arrangement is adapted to be secured to a wheel 130 by interengaging with the annular groove 132 formed by the hub cap bumps 134. In this arrangement wheel 130 is provided with three such bumps 134 and, accordingly, the wheel cover is provided with three equally spaced spring finger assemblies 136. Each spring finger assembly 136 comprises a generally U-shaped bracket 138 fashioned with flanges 140 by means of which the bracket is secured to the inner face of the cover as by rivets 142. Within each bracket 138 there is slideably arranged a spring finger 144. Each spring finger 144 is fashioned with a flat base portion 146 which is formed at the radially inner edge thereof with a U-shaped spring portion 148 terminating in a radially inwardly extending flange 150 having a concave edge 152. Base portion 146 of spring finger 144 is fashioned with a slot having a radially extending entrant portion 154 and a straight portion 156 extending perpendicularly to the entrant portion 154. An opening 158 in cover 128 adjacent each of the brackets 138 accommodates a stud 160 having a small eccentric 162 intermediate its end. The inner end of stud 160 extends through an opening 164 in bracket 138 and is retained therein by a snap ring 166. The diameter of eccentric portion 162 of stud 160 corresponds generally to the width of the slotted portions 154, 156 of spring finger 144. The spring finger is engaged with the stud by directing the eccentric 162 through the entrant slot 154 and then shifting spring finger 144 laterally to engage the eccentric 162 with the opening 164 of the slot. Thereafter the inner end of the stud is inserted in opening 164 in bracket 138 and secured in place by snap ring 166. The spring finger assembly is then attached to the cover as by rivets 142 so that the outer end of the stud (which is fashioned with a screw driver slot) projects through opening 158.

When the cover is positioned against the wheel, flange 150 of spring finger 144 is generally radially aligned with the annular groove 132 on the wheel. To engage the cover with the wheel stud 160 is rotated so that eccentric 162 is disposed radially outwardly of the axis of stud 160. Spring finger 144 is thereby retracted to the position shown in solid lines in FIGS. 17 and 18. Thereafter the cover is placed against the wheel and stud 160 is rotated (as by the screw driver 66) to shift the eccentric to a position radially inwardly of the axis of stud 160. The interengagement of eccentric 162 with the straight slot 156 projects the spring finger radially inwardly and causes the dished edge 152 of the spring finger to flex into engagement with the annular groove 132 on the wheel. The cover is released from the wheel by rotating the studs 160 to retract the spring fingers in a radially outward direction.

The arrangement shown in FIGS. 19 through 25 is somewhat similar in principal to the arrangement shown in FIGS. 15 through 18. However, in the arrangement shown in FIGS. 19 through 25 only one manually operable spring finger 168 is utilized and the two remaining spring fingers 170 are flexed only in response to actuation of spring finger 168. Accordingly, spring fingers 170 are disposed symmetrically with respect to finger 168 and are spaced therefrom through an arc of at least and preferably greater than 90°.

Figure 22:
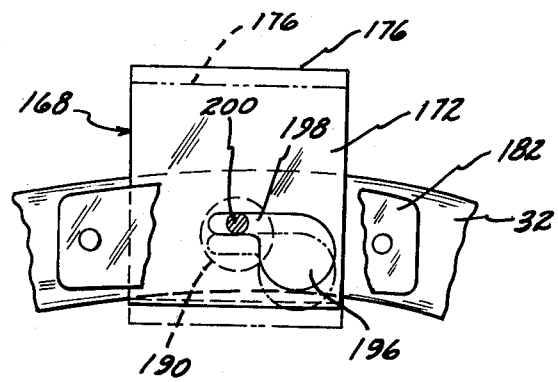
FIG. 22 is a fragmentary view, with parts broken away, of the spring finger and cam assembly.
Figure 23:
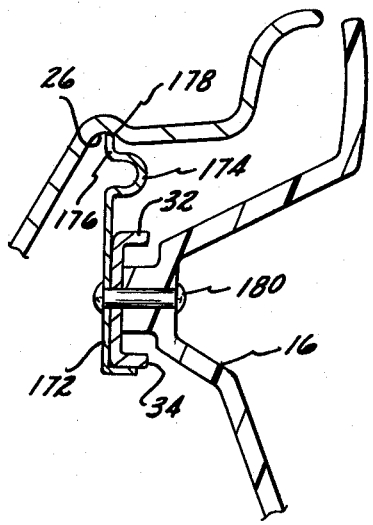
FIG. 23 is a fragmentary sectional view along line 23—23 in FIG. 19 and showing the cover engaged with the wheel.
Figure 24:
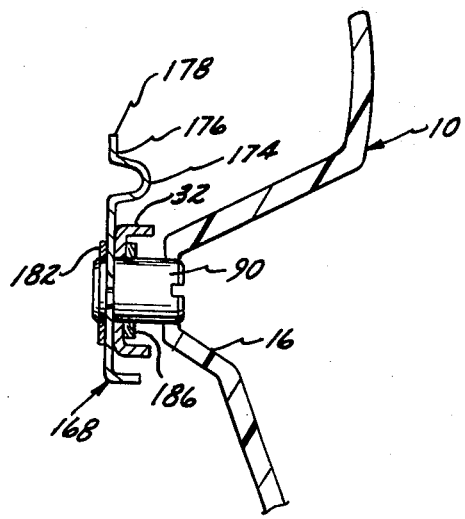
FIG. 24 is a sectional view along line 24—24 in FIG. 19.
Figure 25:
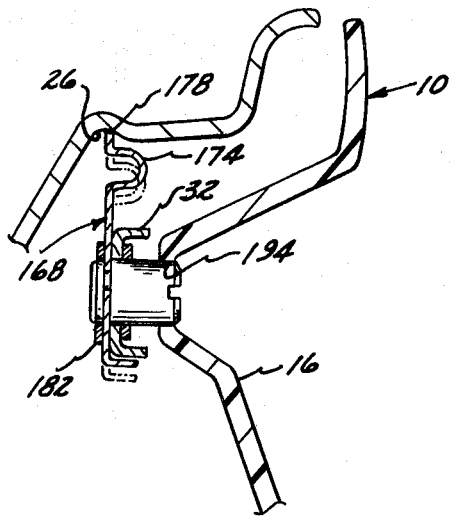
FIG. 25 is a view similar to FIG. 24 and showing the manner in which the cam is operated to engage and disengage the spring finger with the wheel rim.

In this arrangement the wheel cover 10 is generally the same as that shown in FIGS. 1 through 8 and includes the bosses 34 on the rear side of the dished portion 16 on which the reinforcing ring 32 is mounted and valve stem opening 31 diametrically opposite spring finger 168. Each of spring fingers 168, 170 are similarly shaped with a flat base portion 172 having a U-shaped spring portion 174 at its radially outer end. Each spring portion 174 terminates in a radially outwardly extending flange 176 having wheel gripping edge portions 178. Spring fingers 170 are fixedly mounted on the cover by means of rivets 180. However, spring finger 168 is mounted on the cover for radial movement. The means mounting spring finger 168 on the cover includes a bracket 182 which straddles the base portion 172 of spring finger 168 and which is secured to the reinforcing ring 32 by means of rivets 184. Bracket 182, ring 32 and a plate 186 secured within the channel-shaped ring 32 have openings 188 which register with one another and which accommodate a stud 90. The head of stud 190 (which is slotted as at 192 to receive the end of a screw driver) projects through an opening 194 in the dished portion 16 of cover 10. Base portion 172 of spring finger 168 is also fashioned with an opening 196 to accommodate stud 190. However, opening 196 is tangentially extended as a straight narrow slot 198 disposed generally centrally between the opposite side edges of the spring finger. Slot 198 is adapted to be engaged by reduced eccentric 200 on stud 190. The component of parts are assembled by inserting stud 190 through the registering openings 188 in bracket 182, ring 32 and plate 186 and opening 196 in spring finger 168. Thereafter spring finger 168 is shifted laterally to interengage slot 198 with eccentric 200 on stud 190. The assembly is then secured together by rivets 184 and the head of stud 190 is projected through opening 194 in the cover. When the parts are assembled as described and as shown in FIG. 22, opening 196 in spring finger 168 is offset laterally from stud 190.

To engage the cover with the wheel stud 190 is rotated so that eccentric 200 is shifted to a position radially inwardly of the axis of stud 190. This causes spring finger 168 to be shifted to the radially retracted position shown in broken lines in FIGS. 22 and 25. With spring finger 168 retracted the cover can be placed against the face of the wheel so that the three spring fingers 168, 170 have their radially free edges lying generally in the plane of safety groove 26. Thereafter stud 190 is rotated to shift spring finger 168 outwardly. Normally with the cover removed from the wheel, when spring finger 168 is shifted outwardly, the outer corners of each of the three spring fingers define a circle whose diameter is slightly greater than that of safety groove 26. Consequently, when the cover is arranged on the wheel as described and spring finger 168 is displaced radially outwardly, the outer corners of each of the spring fingers engage the safety groove 26 and each of the spring fingers is compressed at the spring portion 174 thereof a similar extent to firmly engage the wheel and center the cover on the wheel.

Figure 26:
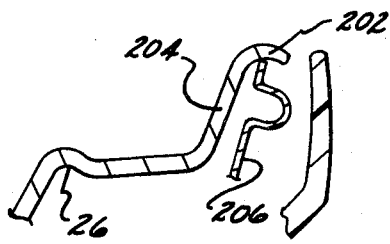
FIG. 26 is a fragmentary sectional view of a modification showing a spring finger engaging a different portion of the wheel rim.

In the arrangement shown in FIGS. 19 through 25 each of the spring fingers is adapted to engage within the safety groove 26 of the wheel to secure the cover on the wheel. This general arrangement can be modified slightly as shown in FIG. 26 so that the spring fingers are adapted to engage the wheel within the groove defined by the outwardly turned edge 202 of the tire bead flange 204. In this arrangement the spring fingers, generally designated 206, are mounted on the cover so that they incline radially outwardly instead of being generally parallel to the radial plane of the wheel as shown in FIGS. 19 through 25.

In the embodiments described herein where only one of the spring fingers is mechanically actuated to relieve the tension on all of the spring fingers, the spring fingers which are not mechanically actuated should preferably be located around the circumference of the wheel cover in a position where they are spaced from the mechanically actuated spring finger through an arc of at least and preferably greater than 90°. This not only facilitates mounting the cover on the wheel but also results in automatic release of the spring fingers which are not mechanically actuated when the tension on the mechanically actuated spring finger is relieved.

We claim:

1. A cover in combination with a vehicle wheel of the type having a wheel body and a tire mounting rim, said wheel having a generally radially facing annular surface on the outer face thereof concentric with the wheel axis, said cover having a body portion adapted to overlie said annular surface when the cover is applied to the outer face of the wheel, a plurality of wheel engaging members, means mounting said wheel engaging members on the inner face of the cover in circumferentially spaced relation adjacent the outer periphery of the cover and concentric with the center thereof, each of said wheel engaging members having wheel engaging portions adapted to frictionally engage and grip said annular surface for retaining the cover on the wheel against axial and circumferential displacement, at least one of said wheel engaging members being spaced circumferentially from the next adjacent wheel engaging members on circumferentially opposite sides thereof through an arc of greater than 90°, said one wheel engaging member comprising a spring finger having a radially projecting, wheel gripping edge portion thereon and at least one circumferentially extending bend therein spaced radially inwardly of said wheel gripping edge portion and forming an axis about which said wheel gripping edge portion is resiliently flexible in a radial direction, said spring finger being displaceable radially in one direction to flex said wheel gripping edge portion about said circumferential bend into firm frictional engagement with said annular surface, said spring finger being radially retractable in the opposite direction to disengage its wheel gripping edge portion from said annular surface, said spring finger having means forming a radially facing abutment thereon, said cover having an opening therethrough spaced radially outwardly from the axial center thereof, said opening being individual to and axially registering with said one wheel engaging member, a movable force applying member extending through said opening and mounted on the cover in an axially fixed position for rotation about an axis extending in a direction axially of the cover, the axially outer end of said force applying member being accessible from the outer side of the cover for actuation, said force applying member having a radially projecting cam element thereon on the rear side of the cover which is operable, when the force applying member is rotated, to engage the radially facing abutment means on the spring finger to flex a portion of the spring finger about said circumferentially extending bend and thereby radially displace the wheel gripping edge portion of said spring finger whereby to enable the cover to be secured to or removed from the wheel by rotating said force applying member.

2. The combination called for in claim 1 wherein the outer end of said force applying member has a configuration which facilitates rotating the same by means of a tool applied thereto from the outer side of the cover.

3. The combination called for in claim 1 wherein said cam element is disposed eccentric to the axis of rotation of the force applying member.

4. The combination called for in claim 1 wherein said cam element is arranged to retract said spring finger in a direction radially inwardly.

5. The combination called for in claim 1 wherein said wheel gripping edge portion is in a normally retracted position and said cam element is adapted to displace said spring finger in a radially outward direction.

6. The combination called for in claim 1 wherein said cam element is operably connected with said spring finger to displace it in both radially inward and radially outward directions.

7. The combination called for in claim 1 wherein each of said wheel gripping members comprises a radially flexible spring finger having a radially extending wheel gripping edge portion inclined in a direction radially and axially outwardly, said annular surface facing radially inwardly.

8. The combination called for in claim 1 wherein each of said wheel gripping members comprises a flexible spring finger having a radially extending wheel gripping edge portion.

9. The combination called for in claim 1 wherein said spring finger in its unstressed condition has two wheel gripping edge portions out of contact with said annular surface and said cam element is adapted to displace said spring finger radially to interengage the wheel gripping edge portions with said annular surface.

10. The combination called for in claim 1 wherein said abutment means comprises the edge of an opening in said spring finger in which said cam element is disposed.

11. The combination called for in claim 10 wherein said cam element comprises an eccentric portion on the force applying member and said edge of the opening in the spring finger extends in a direction generally circumferentially of the cover.

12. The combination called for in claim 10 wherein said cam element comprises an eccentric pin on the force applying member and said opening in the spring finger comprises a slot through which said pin extends, said slot extending generally circumferentially of the cover and being spaced radially inwardly of said bend.

13. The combination called for in claim 1 wherein said abutment means is spaced inwardly from and out of engagement with said cam element when the wheel gripping edge portion of the spring finger is in engagement with said annular surface and being engaged by said cam element to retract said wheel gripping edge portion out of engagement with said annular surface when the force applying member is rotated.

14. The combination called for in claim 13 wherein said wheel gripping edge portion of the spring finger is inclined in a direction radially and axially outwardly.

15. The combination called for in claim 1 wherein said spring finger has radially spaced inner and outer spring legs each connected with an intermediate section of the spring finger by a circumferentially extending bend, the inner spring leg having a radially inwardly projecting edge portion adapted to interengage with a radially outwardly facing annular surface on the wheel body and the radially outer leg having a radially outwardly projecting edge portion adapted to interengage with a radially inwardly facing annular surface on the rim, said cam element on the force applying member when rotated being operable to radially displace both of said spring fingers.

16. The combination called for in claim 15 wherein said edge portions of said legs in the unstressed condition of the legs are spaced radially away from the respective annular surfaces with which they are adapted to be interengaged.

17. The combination called for in claim 16 wherein said cam element is disposed between said spring legs and adapted to spread said spring legs apart when the force applying member is rotated to interengage said edge portions with the annular surfaces on the rim and wheel body.

18. The combination called for in claim 1 wherein said spring finger has three portions comprising a resiliently flexible, radially outwardly extending first portion connected to the cover and flexible relative thereto, said circumferentially extending bend being formed on said first portion, a second portion comprising said wheel gripping edge portion at the radially outer end of the first portion and adapted to frictionally engage and grip said annular surface and a third portion extending from said first portion and forming a radially inwardly extending tab terminating in a free radially inner end, said radially facing abutment means being located on said tab.

19. The combination set forth in claim 18 wherein said abutment means comprises the edge of an opening in said tab in which said cam element is disposed.

* * * * *